United States Patent
Kobayashi et al.

[19]

[11] Patent Number: 6,164,184

[45] Date of Patent: Dec. 26, 2000

[54] REACTION MECHANISM FOR BOOSTER

[75] Inventors: Kazuo Kobayashi; Masahiro Ikeda; Tohru Satoh, all of Saitama-Ken, Japan

[73] Assignee: Jidosha Kiki Co., Ltd., Tokyo, Japan

[21] Appl. No.: 09/387,225

[22] Filed: Aug. 31, 1999

Related U.S. Application Data

[62] Division of application No. 08/859,739, May 21, 1997, Pat. No. 6,003,426.

[30] Foreign Application Priority Data

| May 31, 1996 | [JP] | Japan | 8-160595 |
| Jun. 21, 1996 | [JP] | Japan | 8-181435 |

[51] Int. Cl.[7] ................................................. F15B 9/10
[52] U.S. Cl. .................. 91/376 R; 92/130 C; 92/130 D
[58] Field of Search ....................... 91/376 R; 92/130 C, 92/130 D

[56] References Cited

U.S. PATENT DOCUMENTS

| 1,882,543 | 10/1932 | Bragg et al. |
| 1,960,996 | 5/1934 | Guernsey . |
| 3,199,298 | 8/1965 | Brown ........................................ 60/552 |
| 3,974,741 | 8/1976 | Ohmi . |
| 4,089,252 | 5/1978 | Patel et al. . |
| 4,565,067 | 1/1986 | Tani et al. . |
| 5,337,650 | 8/1994 | Uyama . |

*Primary Examiner*—F. Daniel Lopez
*Attorney, Agent, or Firm*—Flynn, Thiel, Boutell & Tanis, P.C.

[57] ABSTRACT

In accordance with the invention, a booster is not provided with a mechanism which transmits a braking reaction, and accordingly, a reaction cannot be transmitted to a brake pedal. On the other hand, a pseudo-reaction imparting means is provided to impart a pseudo-reaction which depends on an amount of depression of the brake pedal. The pseudo-reaction imparting means imparts a pseudo-reaction having a reduced rate of increase to the brake pedal when a travel of the brake pedal is small, and imparts a pseudo-reaction having an increased rate of increase to the brake pedal when a travel of the break pedal is higher. This arrangement avoids the drawback of the prior art that an abnormally high braking reaction is transmitted to a driver as a result of an operational lag of a conventional booster during a quick braking operation. The invention prevents such braking reaction from being transmitted to a driver, but enables a reaction of a required magnitude to be transmitted to the driver by means of pseudo-reaction imparting means. In this manner, a required high braking effort can be obtained with a reduced force of depression during a quick braking operation. The pseudo-reaction imparting means which exhibit such characteristic is capable of realizing an operation feeling, as experienced in a normal operation in the prior art, independently from a quick and a slow braking operation.

6 Claims, 9 Drawing Sheets

REACTION MECHANISM FOR BOOSTER

This is a division of Ser. No. 08/859,739, filed May 21, 1997, U.S. Pat. No. 6,003,426.

FIELD OF THE INVENTION

The invention relates to a booster as may be used in a brake of an automobile, and more particularly, to a reaction mechanism for booster which imparts reaction force to an operating rod which actuates the booster.

DESCRIPTION OF THE PRIOR ART

A brake booster is known in the art which comprises a valve body slidably disposed within a shell, a power piston mounted on the valve body, a constant and a variable pressure chamber defined across the power piston, a valve mechanism disposed in the valve body, an input shaft connected to a brake pedal serving as an operating rod and adapted to drive a valve plunger, which forms part of the valve mechanism, back and forth to thereby switch a flow path in the valve mechanism, and an output shaft driven forward as the valve body is driven forward to cause a piston of a master cylinder to be driven forward, thereby developing a braking liquid pressure.

A conventional reaction mechanism is provided with a reaction disc formed of rubber and disposed between the output shaft and the valve plunger so that when the brake booster is actuated, both the valve body and the valve plunger are brought into contact with the reaction disc simultaneously, part of a braking force applied to the output shaft being transmitted to the valve body while the remainder thereof is transmitted to the valve plunger, the braking reaction force transmitted to the valve plunger being sensed by a driver through the input shaft and the brake pedal.

A serve ratio of the brake booster can be changed by changing the ratio of the reaction force transmitted to the valve body and the reaction force transmitted to the valve plunger, and more specifically, the ratio of pressure-responsive areas of the both members. A high serve ratio is generally established in the brake booster so that a braking liquid pressure of an increased magnitude can be developed with a depression of the brake pedal with a reduced force. However, it is found that during a quick braking operation, a serve ratio of a predetermined magnitude cannot be obtained as a result of an operational lag of the brake booster, and it is difficult for a less powerful driver such as an aged person or woman to perform a quick braking operation.

More specifically describing the reason, when the brake pedal is depressed, a flow path in the valve mechanism is switched through the input shaft, whereby a pressure fluid is introduced into the variable pressure chamber to drive the power piston and the valve body forward. As the valve body is driven forward, the output shaft is also driven forward through the reaction disc, the forward movement of the output shaft developing a braking pressure. A reaction therefrom is applied to the output shaft, and the brake reaction applied to the output shaft is distributed between the valve body and the valve plunger in a manner mentioned above. However, the valve plunger which is connected to the brake pedal through the input shaft will be driven forward before the power piston and the valve body are driven forward by the pressure fluid which is introduced into the variable pressure chamber during a quick braking operation, and as a consequence, a major proportion of the braking reaction which is applied to the output shaft will be transmitted to the valve plunger. This results in a braking reaction of an abnormally high magnitude being transmitted to the driver. Consequently, when a quick braking operation is to be performed, the brake pedal must be depressed by overcoming the abnormal braking reaction which is transmitted. As compared with a normal braking operation in which the brake pedal is gradually depressed to achieve a high braking force, a braking force of an increased magnitude which is required for a quick braking operation cannot be obtained unless the brake pedal is depressed with a force which is much greater than in a normal braking operation.

SUMMARY OF THE INVENTION

In view of the foregoing, the invention provides a reaction mechanism for booster which enables a high output to be obtained with a reduced force of depression during a quick braking operation without degrading a normal operation feeling of the booster.

Thus, the invention relates to a booster including a valve body slidably disposed within a shell, a power piston mounted on the valve body, a constant and a variable pressure chamber defined across the power piston, a valve mechanism disposed in a valve body, an input shaft connected to an operating rod for driving a valve plunger, which forms a valve mechanism, back and forth to switch a flow path in the valve mechanism, and an output shaft which is driven forward as the valve body is driven forward. In accordance with the invention, there is provided pseudo-reaction imparting means which prevents the reaction applied to the output shaft during the operation of the booster from being transmitted to the valve plunger and which imparts a pseudo-reaction which depends on a travel of the input shaft to the operating rod. The pseudo-reaction imparting means is arranged such that a pseudo-reaction having a lower rate of increase is imparted to the operating rod when a travel of the operating rod is low, while a pseudo-reaction having a higher rate of increase is imparted to the operating rod when a travel of the operating rod is higher.

With the described arrangement, upon actuation of the booster, the reaction applied to the output shaft is prevented from being transmitted to the valve plunger, and accordingly, during a quick braking operation, if the valve plunger which is connected to the operating rod through the input shaft is driven forward before the power piston and the valve body are driven forward by pressure fluid introduced in the variable pressure chamber, the transmission of a reaction applied to the output shaft to a driver through a path including the valve plunger, the input shaft and the operating rod is prevented.

On the other hand, the pseudo-reaction imparting means transmits a pseudo-reaction which depends on a travel of the operating rod to the driver through the operating rod. In this manner, the transmission of an abnormally high reaction during a quick braking operation is prevented, and instead, a high output can be obtained with a reduced operating force in the same manner as in a usual operation.

As mentioned above, the pseudo-reaction imparting means imparts a pseudo-reaction having a lower rate of increase to the operating rod when a travel of the operating rod is low, and imparts a pseudo-reaction having an increased rate of increase to the operating rod when a travel of the operating rod is high. Accordingly, a similar operation feeling as in a usual operation can be obtained independently from a quick and a slow braking operation. By way of example, when an operating rod comprises a brake pedal, during an initial phase of the braking operation, an increase in the pseudo-reaction will be low if the brake pedal is depressed through an increased stroke, but after a braking force of certain magnitude is developed, the magnitude of pseudo-reaction will increase relative to the amount of depression of the brake pedal if it is small. The pseudo-reaction imparting means which exhibits such characteristic is effective in realizing such a normal operation feeling.

Above and other objects, features and advantages of the invention will become apparent from the following description with reference to the attached drawings.

DETAILED DESCRIPTION OF THE EMBODIMENTS

Figure 1:
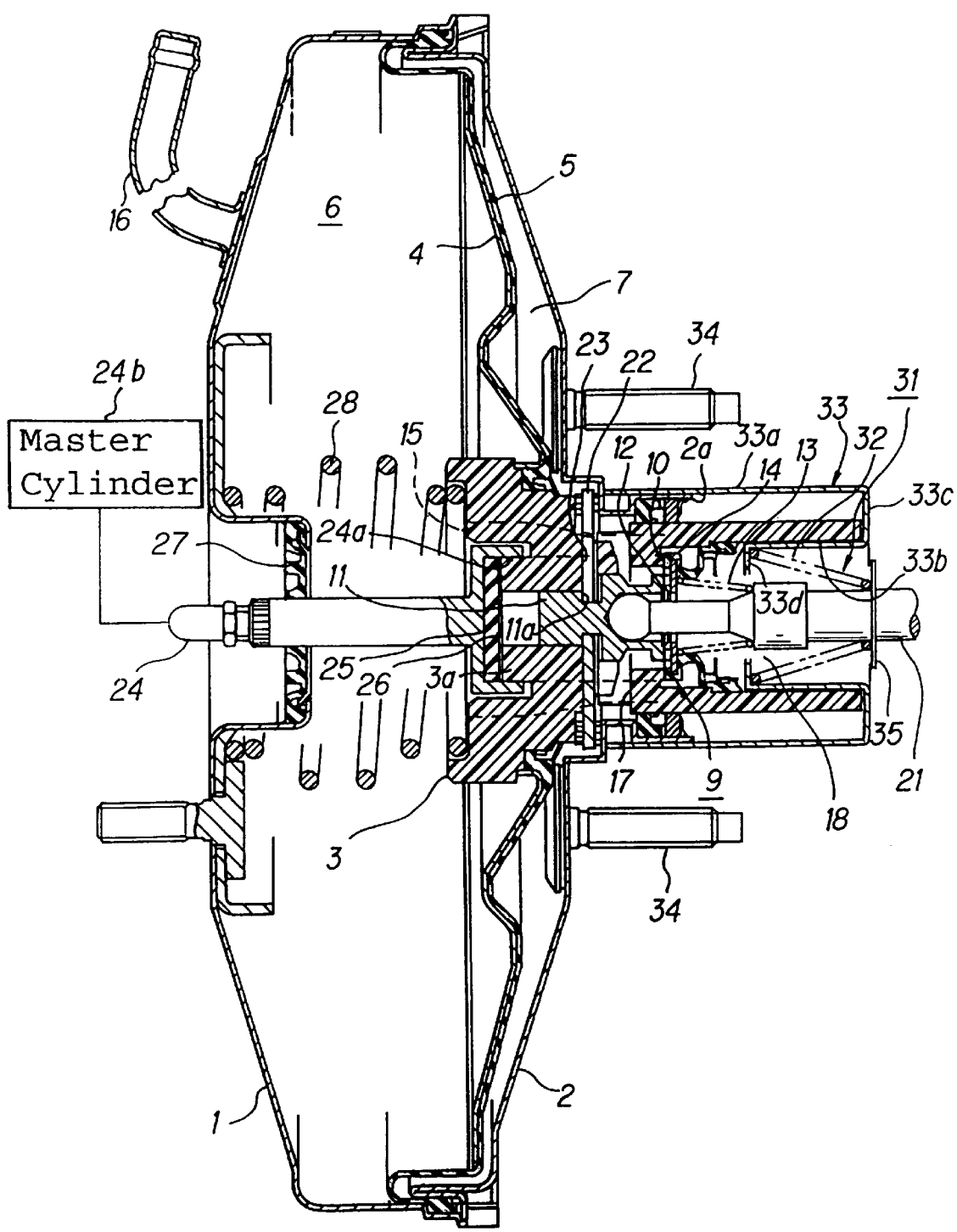
FIG. 1 is a cross section of a first embodiment of the invention.

Referring to the drawings, several embodiments of a brake booster to which the invention is applied will be described. Referring to FIG. 1, a front shell 1 and a rear shell 2 constitute together an enclosed vessel, in which a substantially tubular valve body 3 is slidably disposed. A power piston 4 is mounted around the outer periphery of the valve body 3 and a diaphragm 5 is applied to the rear side thereof, thus partitioning the interior of the enclosed vessel into a forwardly located constant pressure chamber 6 and a rearwardly located variable pressure chamber 7.

The valve body 3 contains a valve mechanism 9 which switches a fluid circuit. Specifically, the valve mechanism 9 comprises an annular first valve seat 10 formed around the inner periphery of the valve body 3, an annular second valve seat 12 formed on the right end of a valve plunger 11 which is slidably fitted in the valve body 3, and a valve element 14 which is urged from the right, as viewed in FIG. 1, to be seated upon either valve seat 10 or 12 under the influence of a poppet return spring 13.

A space located radially outward of the first valve seat 10 communicates with the constant pressure chamber 6 through an axial constant pressure passage 15 formed in the valve body 3, and the constant pressure chamber 6 communicates with an intake manifold of an engine through a tubing 16 mounted on the front shell 1 for introducing a negative pressure. In this manner, a negative pressure is normally introduced into the chamber 6. A space located intermediate the first valve seat 10 and the second valve seat 12 communicates with the variable pressure chamber 7 through a radial variable pressure passage 17 formed in the valve body 3. Finally, a space located radially inward of the second valve seat 12 communicates with the atmosphere through a pressure passage 18 formed in the valve body 3.

The right end of the valve plunger 11 is pivotally connected with a distal end of the input shaft 21, the other end of which is connected to a brake pedal (operating rod), not shown. The plunger 11 is prevented from being disengaged from the valve body 3 by means of a key member 22. While not shown, the key member 22 is forked in a region from its center toward the distal end thereof, and the key member 22 is inserted into a receiving hole 23 which is diametrically formed in the valve body 3, with the end from which the forked portion extends is engaged with a portion 11a of the valve plunger which has a reduced diameter.

It is to be noted that the key member 22 is displaceable axially of the valve body 3 within the hole 23, and the key member 22 and the valve plunger 11 are displaceable axially of the valve body 3 within an extent of the axial length of the portion 11a. When the brake booster is inoperative, the key member 22 is held in abutment against the inner surface of the rear shell 2 to maintain the key member 22 and the valve plunger 11 at an advanced position relative to the valve body 3 so that a lost motion of the input shaft 21 at the commencement of operation of the brake booster can be reduced.

Formed in the right end of an output shaft 14 and which is disposed to the left of the valve plunger 11 is a recess 24a in which an elastic member 25 formed of rubber and a spacer 26 formed of a metal disc are sequentially fitted, and an annular projection 3a formed to extend from the right end of the valve body 3 is also slidably fitted in the recess 24a.

The left or the distal end of the output shaft 24 projects externally of the front shell 1 with a seal 27 maintaining a hermetic seal, and the distal end is connected to a piston of a master cylinder 24b which is connected to the front shell 1. It is to be noted that the valve body 3 and the power piston 4 are normally maintained in the inoperative position shown by a return spring 28.

It is to be understood that in a conventional practice, the spacer 26 has been omitted, and the left end face of the valve plunger 11 is disposed in opposing relationship with the elastic member 25, serving as a reaction disc, with a very slight clearance therebetween so that when the brake booster is actuated, the brake reaction transmitted from the output shaft 24 can be transmitted to both the valve body 3 and the valve plunger 11 through the elastic member 25, and the braking reaction transmitted to the valve plunger 11 is transmitted to a driver input through the input shaft 21 and a brake pedal (operating rod), not shown.

By contrast, in the present embodiment, the spacer 26 is included, and an increased spacing is provided between the spacer 26 and the valve plunger 11 so that an abutment therebetween can be avoided even during a quick braking operation. In this manner, the entire braking reaction which is transmitted from the output shaft 24 is transmitted to the valve body 3 through the elastic member 25 and the spacer 26 while no braking reaction is transmitted to the valve plunger 11, and hence to the brake pedal. In the present embodiment, the elastic member 25 is used as an impact buffering member.

The described arrangement alone cannot provide a brake feeling to a driver. Accordingly, a pseudo-reaction imparting means 31 is provided to impart a pseudo-reaction which depends on an amount of depression of the brake pedal to a driver.

The pseudo-reaction imparting means 31 utilizes a valve return spring 32 which urges the input shaft 21 rearwardly.

In the conventional practice, a valve return spring is disposed between the valve body 3 and the input shaft 21, but in the present embodiment, it is disposed between a tubular member 33 which is integral with the carrosserie (a part of a car body) and the input shaft 21.

The tubular member 33 comprises an outer tubular portion 33a, an inner tubular portion 33b which is inserted into the valve body 3 from the right side thereof, a connector portion 33c which joins both tubular portions 33a, 33b at their right ends, and a flange 33d which projects radially inward from the left end of the inner tubular portion 33b. The rear shell 2 includes, at its center, a tubular portion 2a which extends rearwardly and which is disposed as a press fit within the outer tubular portion 33a while the left end face of the outer tubular portion 33a is held in abutment against the outer surface of the rear shell 2 simultaneously, thus integrally connecting the tubular members 33 and the rear shell 2 together. The rear shell 2 is mounted on the carrosserie, not shown, by means of a mounting bolt 34 shown mounted thereon, and therefore it will be seen that the tubular member 33 is fixedly mounted on the carrosserie through the rear shell 2. A retainer 35 is fixedly mounted on the input shaft 21, and the valve return spring 32 is disposed between the flange 33d of the tubular member 33 and the retainer 35 to urge the input shaft 21 rearward.

With the described arrangement, when the brake pedal is depressed to drive the input shaft 21 and the valve plunger 11 forward, a flow path within the valve mechanism 9 is switched to introduce the atmosphere into the variable pressure chamber 7 in the similar manner as in a conventional brake booster. Accordingly, a pressure differential between the constant pressure chamber 6 and the variable pressure chamber 7 is effective to drive the power piston 4 and the valve body 3 forward, thus causing the output shaft 24 to be driven forward to develop a braking liquid pressure in a master cylinder.

A braking reaction which is produced by the braking liquid pressure is entirely transmitted to the valve body 3 through the output shaft 24, the elastic member 25 and the spacer 26, and no portion thereof is transmitted to the valve plunger 11.

On the other hand, when the brake pedal is depressed to drive the input shaft 21 forward, it will be seen that the input shaft 21 moves forward while compressing the valve return spring 32 against the flange 33d of the tubular member 33 which is fixedly mounted on the carrosserie, and accordingly, there results a pseudo-reaction which is proportional to the compression of the valve return spring 32. This pseudo-reaction is transmitted to a driver through the input shaft 21 and the brake pedal. Accordingly, by choosing an optimum condition for a preset load, preset length or spring constant of the valve return spring 32, there can be obtained an excellent brake feeling comparable to the prior art for the driver.

It will be seen that the pseudo-reaction imparting means 32 imparts a pseudo-reaction to the brake pedal, which remains substantially the same during a quick braking operation as in a normal braking operation, thus avoiding the occurrence of an abnormally high braking reaction as experienced with a conventional arrangement during a quick braking operation. In this manner, a high braking output can be obtained with a relatively low force of depression during a quick braking operation, and a reliable quick braking operation can be assured for a powerless driver such as an aged person or woman.

It is to be noted that the elastic member 25 and the spacer 26 may be omitted.

Second Embodiment

Figure 2:
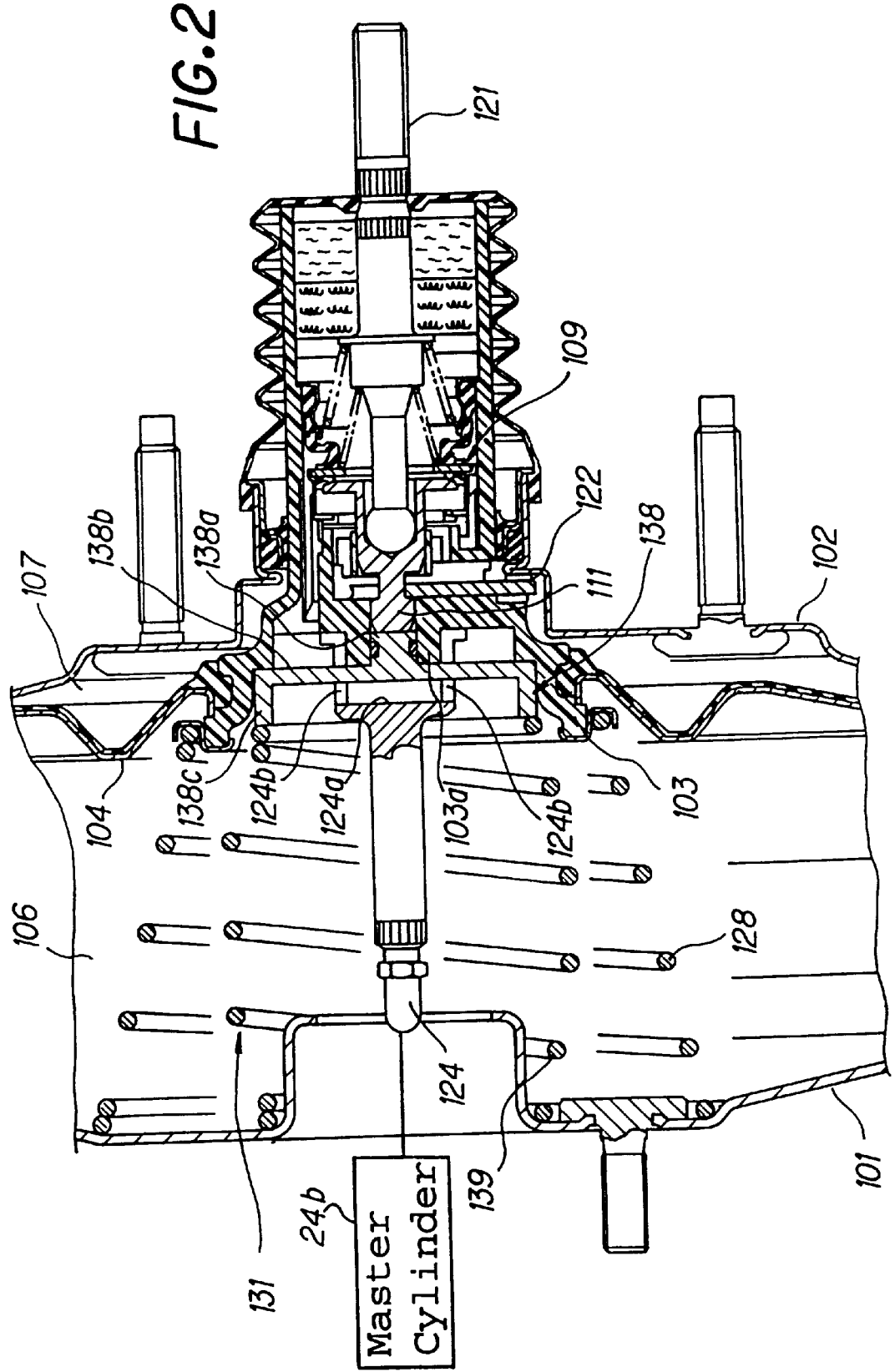
FIG. 2 is a cross section of a second embodiment of the invention.

FIG. 2 shows a second embodiment of the invention in which a pseudo-reaction imparting means 131 is contained within the brake booster. It should be noted that parts and members corresponding to those shown in FIG. 1 are designated by like numerals as used before to which 100 is added.

The pseudo-reaction imparting means 131 includes a reaction piston 138 disposed forwardly of a valve body 103. The reaction piston 138 includes a portion 138a of a reduced diameter located at the right end, a pair of arms 138b extending radially outward from the left end of the portion 138a, and a tubular portion 138c extending from the distal ends of arms 138b. The portion 138a is slidably fitted into the valve body 103, from the front side, while maintaining a hermetic seal therebetween. When the brake booster is inoperative, a valve plunger 111 is substantially in abutment against the portion 138a.

Formed in the right end of an output shaft 124 is a recess 124a, in which an annular projection 103a formed at the right end of the valve body 103 is fitted while the right end face of the output shaft is held in abutment against the valve body 103, thus connecting the both members integrally or in a manner to prevent a relative displacement therebetween.

The right end of the output shaft 124 (FIG. 2) is formed with slits 124b which extend axially thereof, thus allowing the arms 138b of the reaction piston 138 to extend therethrough. In this manner, an axial displacement of the reaction piston 138 with respect to the output shaft 124 is permitted. A spring 139 is provided between the tubular portion 138c of the reaction piston 138 and a front shell 101 to produce a pseudo-reaction.

In other respects, the arrangement is similar to the first embodiment. In the present embodiment, when the booster is inoperative as shown, or when a key member 122 abuts against the inner surface of a rear shell 102 to maintain the key member 122 and a valve plunger 111 at an advanced position relative to the valve body 103, the valve plunger 111 abuts the against the portion 138a of the reaction piston 138. When the brake pedal is depressed under this condition to drive an input shaft 121 and the valve plunger 111 forward, the spring 139 will be compressed, whereby a pseudo-reaction having a magnitude which is proportional to the compression of the spring is transmitted to a driver through the reaction piston 138, the valve plunger 111 and the input shaft 121.

On the other hand, the braking reaction which is applied to the output shaft 124 is entirely transmitted to the valve body 103, and no portion thereof is transmitted to the valve plunger 111, and hence to the brake pedal.

As a consequence, an excellent brake feeling which is comparable to the prior art is assured for the driver, and a reliable quick braking operation is assured for a physically weaker driver such as an aged person or woman.

When the brake booster is released, or when the brake pedal is released, the retracting movement of the reaction piston 138 is limited by abutment against the valve body 103, but the valve plunger 111 is allowed to retract relative to the valve body 103 until its retracting movement is limited by the key member 122, whereby the valve plunger 111b will be spaced from the portion 138a having a reduced diameter of the reaction piston 138.

When the pressure within the variable pressure chamber 107 is reduced as a result of switching the flow path of the valve mechanism 109, a power piston 104 and the valve body 103 retract under the influence of a return spring 128. The retracting movement will be limited initially when the key member 122 abuts against the inner surface of the rear shell 102, but the valve body 103 continues to retract until it abuts against the key member 122 where it comes to a stop.

Under this condition, the key member 122 and the valve plunger 111 which is associated therewith will be maintained at an advanced position relative to the valve body 103, and return to their inoperative conditions as the valve plunger 111 moves forward when the distal end thereof abuts against the portion 138a of the reaction piston 138.

Third Embodiment

Figure 3:
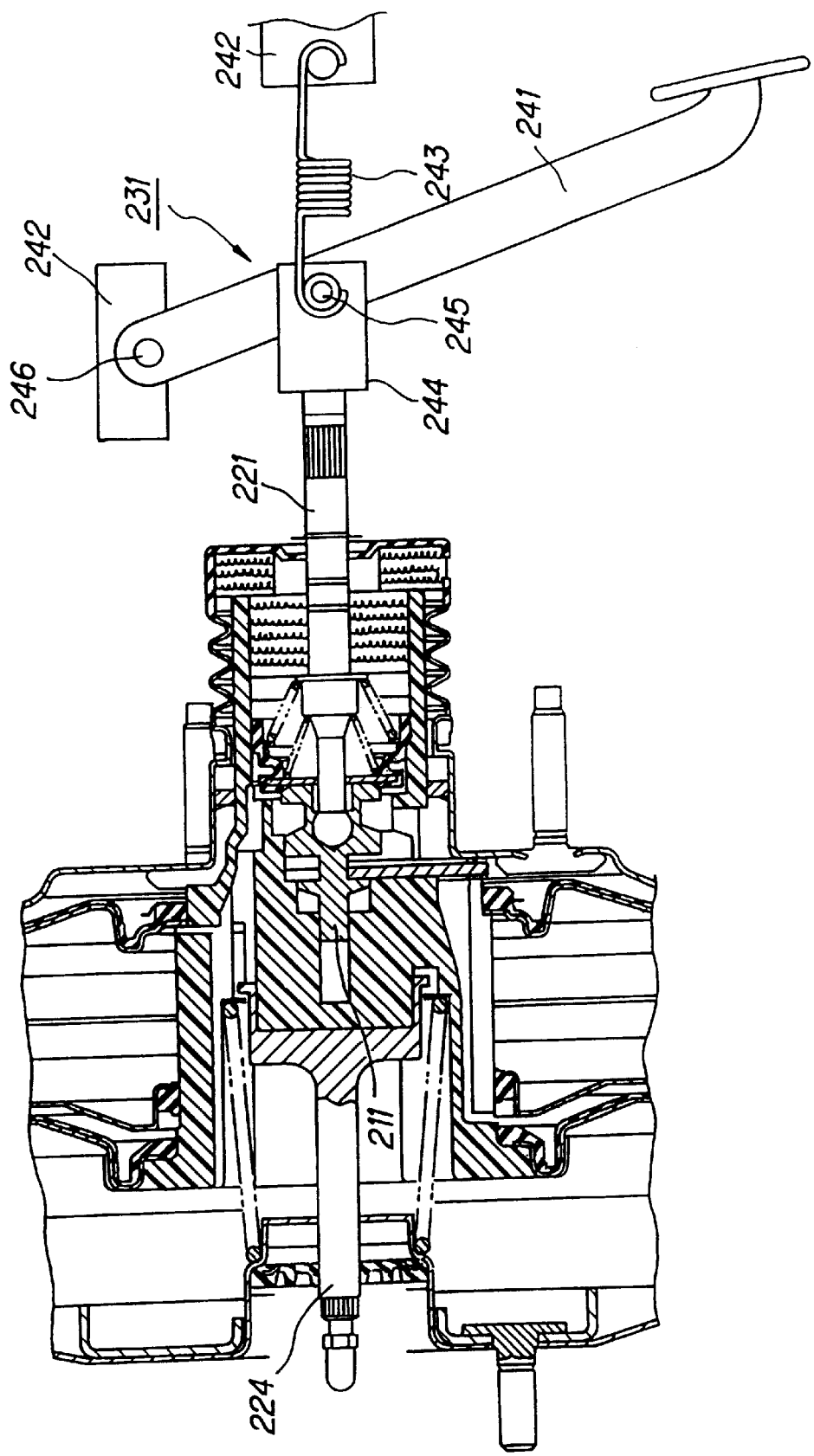
FIG. 3 is a cross section of a third embodiment of the invention.

FIG. 3 shows a third embodiment of the invention where it is to be noted that corresponding parts or members as shown in FIG. 1 are designated by like numerals as used before to which 200 is added.

In the present embodiment, a pseudo-reaction imparting means 231 comprises a spring 243 disposed between a brake pedal 241 and a carrosserie 242. Specifically, a clevis 244 is mounted on one end of an input shaft 221, and the clevis 244 and the brake pedal 241 are connected together by a clevis pin 245. One end of the spring 243 is engaged with the pin 245. It is to be noted that the distal end of the brake pedal 241 is connected to a carrosserie 242 in a rockable manner by a connecting pin 246. Rather than utilizing the clevis pin 245, the spring 243 may be directly connected to the brake pedal 241 or to the input shaft 241. It will be apparent that the use of such pseudo-imparting means 231 is effective to achieve the functioning as mentioned above.

It is to be noted that in the present embodiment, an opening in which the distal end of a valve plunger 211 is slidably fitted so as to prevent a braking reaction applied to an output shaft 224 from being transmitted to the valve plunger 211 is not a through-opening as shown in the described embodiments, but has its end located toward the output shaft 224 blocked.

In the described embodiments, pseudo-reaction imparting means 31, 131 and 231 utilize springs 32, 139 and 243 as elastic members, but the use of such springs is not essential, but an elastic member such as formed of rubber may also be used.

Fourth Embodiment

Figure 4:
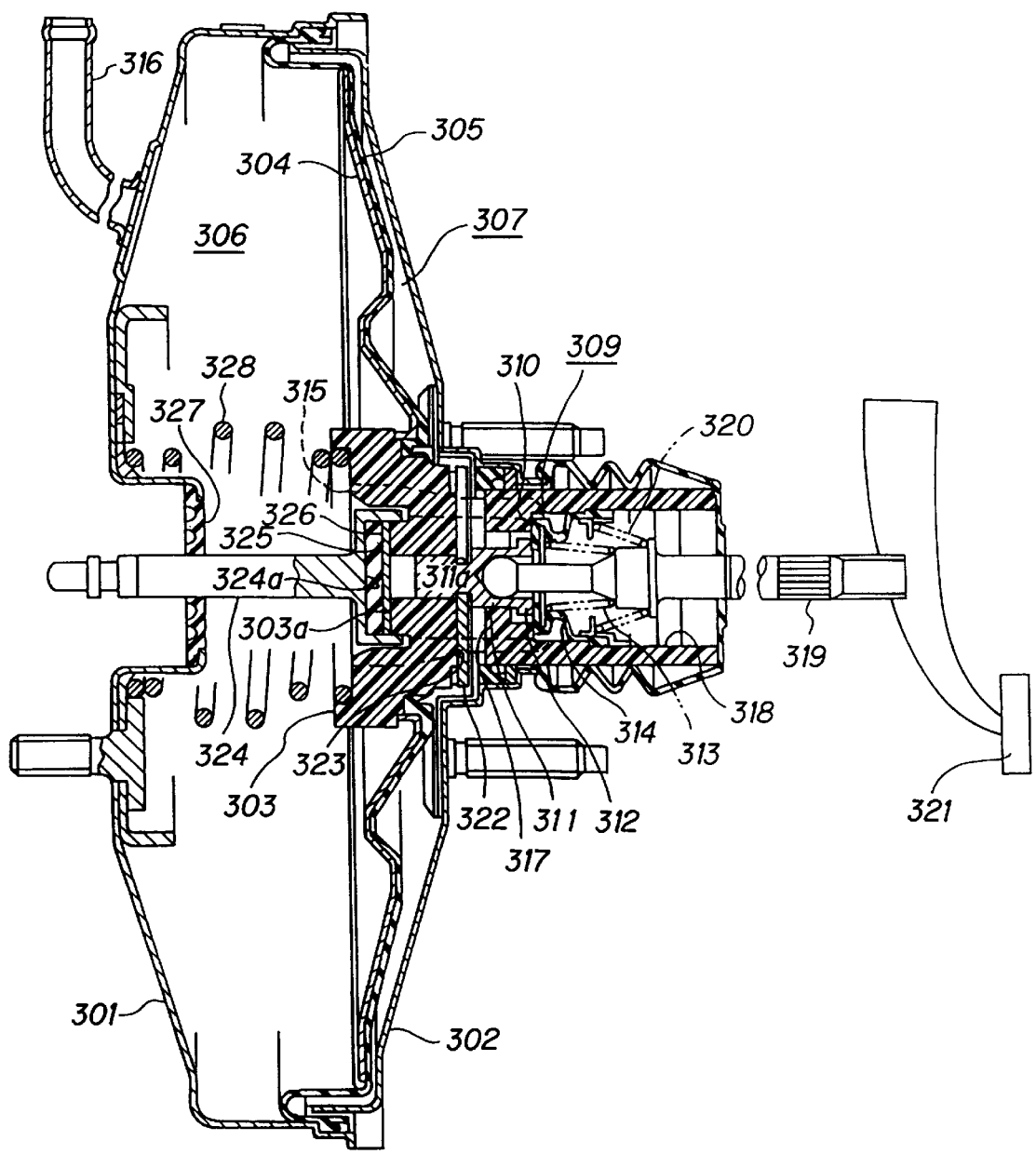
FIG. 4 is a cross section of a fourth embodiment of the invention.
Figure 5:
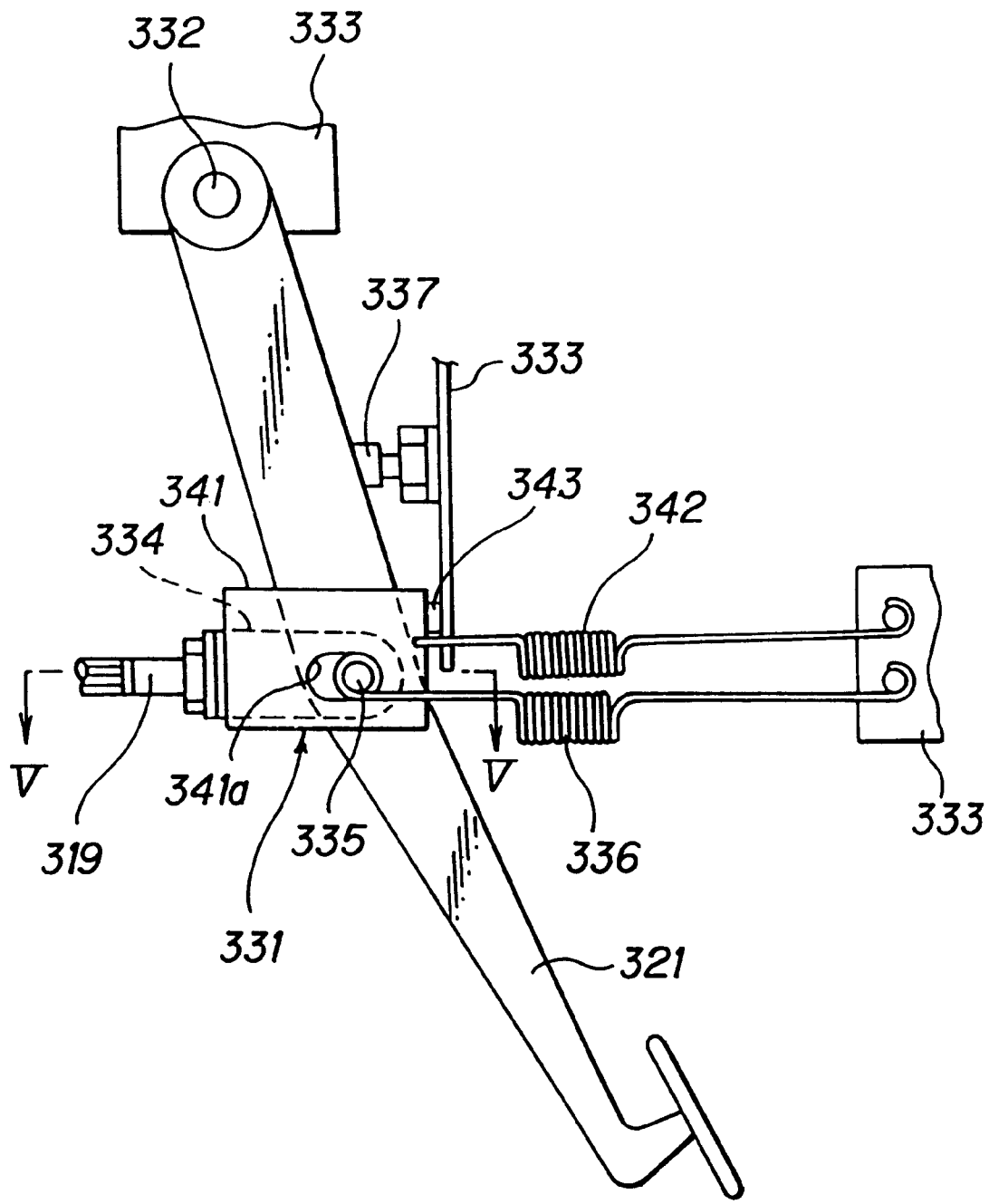
FIG. 5 is an enlarged view of part shown in FIG. 4.
Figure 6:
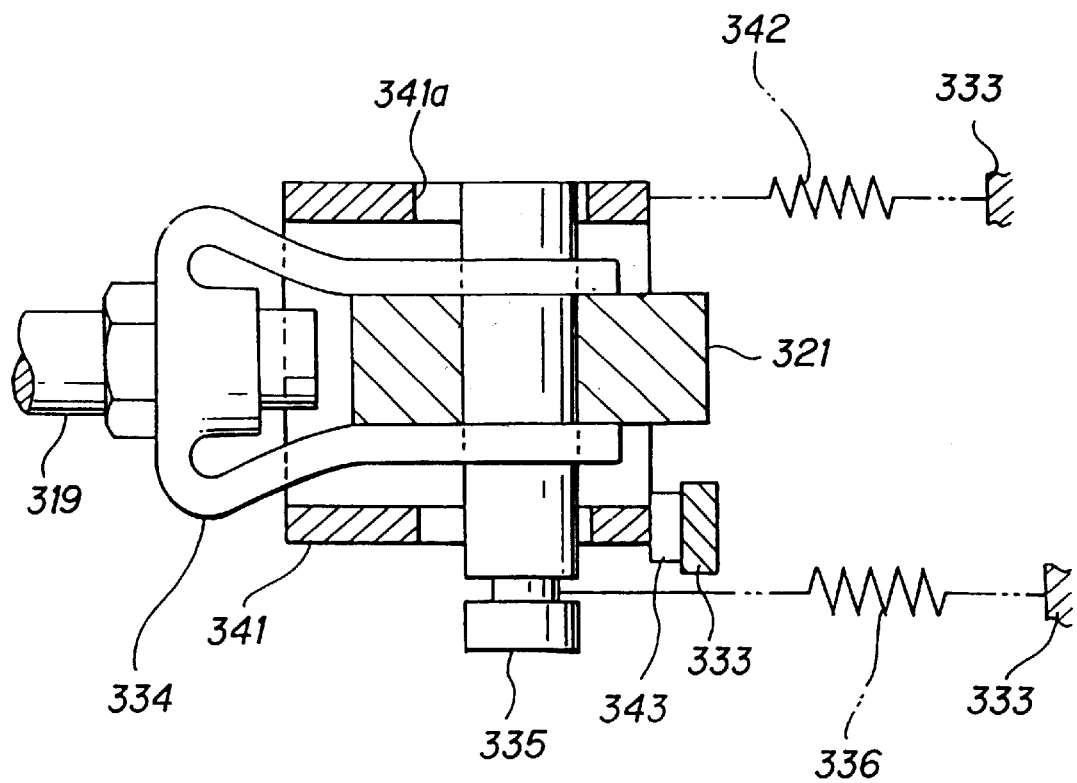
FIG. 6 is a cross section taken along the line V—V shown in FIG. 5.

FIGS. 4 to 6 show a fourth embodiment of the invention in which a first spring 336 and a second spring 342 constitute together a pseudo-reaction imparting means 331 of the present embodiment in contra-distinction to the previous embodiments in which a single spring 32, 139 or 243 is used. It is to be understood that the essential parts of the brake booster according to the fourth embodiment shown in FIG. 4 are similar in construction to that of a brake booster shown in the first embodiment, and accordingly, corresponding parts or members are designated by like reference numerals as used in the first embodiment to which 300 is added.

Referring to FIG. 5, a brake pedal 321 has its one end connected to a carrosserie 333 in rockable manner by means of a connecting pin 332. A first clevis 334 is mounted on one end of an input shaft 319, and a clevis pin 335 extends through the first clevis 334 and through the brake pedal 321, thus connecting the input shaft 319 and the brake pedal 321 together.

As shown in FIGS. 5 and 6, the first spring 336 having a reduced resilience is disposed between the clevis pin 335 and the carrosserie 333, and the tension of the first spring 336 is effective to hold the brake pedal 321 in abutment against a first stop 337 (FIG. 5) mounted on the carrosserie 333 normally. Rather than connecting it to the clevis pin 335, the first spring 336 may be directly connected to the brake pedal 321, to the first clevis 334 or to the input shaft 319.

The first clevis 334 is provided within a second clevis 341 so as to be reciprocable axially of the input shaft 319, and the opposite ends of the clevis pin 335 are engaged with elongate slots 341a formed axially of the input shaft 319 in the second clevis 341, whereby a relative movement between the first clevis 334 and the second clevis 341 is possible within an extent of the length of the elongate slots 341a. The second spring 342 having a resilience which is greater than the resilience of the first spring 336 is disposed between the second clevis 341 and the carrosserie 333 and extends in a parallel relationship with the first spring 336. The tension of the spring 342 is effective to maintain the second clevis 341 normally in abutment against a second stop 243 provided on the carrosserie 333. Under this condition, the clevis pin 335 lies toward the rear end of the elongate slots 341a.

With the described arrangement, when the brake pedal 321 is depressed to drive the input shaft 319 and a valve plunger 311 forward, a flow path in a valve mechanism 309 is switched to introduce the atmosphere into a variable pressure chamber 307 in the similar manner as in a conventional booster, whereby a pressure differential between a constant pressure chamber 306 and the variable pressure chamber 307 drives a power piston 304 and a valve body 303 forward to thereby drive the output shaft 324 forward, causing a braking liquid pressure to be developed in a master cylinder. A braking reaction which results from the braking liquid pressure is entirely transmitted to the valve body 303 through the output shaft 324, an elastic member 325 and a spacer 326, but not transmitted to the valve plunger 311.

On the other hand, when the brake pedal 321 is depressed, it initially causes the first spring 336, and then the second spring 342 to be tensioned, whereby a pseudo-reaction which depends on such tension is produced on the brake pedal 321.

Specifically, when the brake pedal 321 is depressed, it is initially subject to the resilience of the spring 336. As the brake pedal 321 is depressed further, and the clevis pin 335 which is integral with the brake pedal 321 moves to the forward end of the elongate slots 341a formed in the second clevis 341, the clevis pin 335 causes the second clevis 341 to be driven forward against the resilience of the second spring 342, whereupon the resilience of both the first spring 336 and the second spring 342 which are disposed parallel to each other acts simultaneously upon the brake pedal 321.

Figure 7:
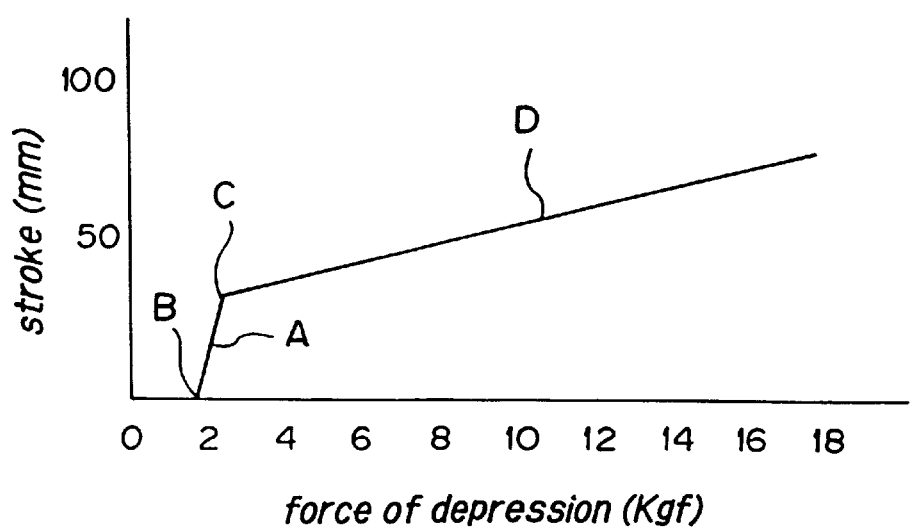
FIG. 7 graphically shows the characteristic diagram of a fourth embodiment.

A resulting relationship between the stroke of the brake pedal 321 and a force of depression is graphically shown in FIG. 7, where a characteristic represented by a straight line A is produced by the first spring 336 and has a slope which is determined by a spring constant $k_1$ of the first spring 336, and an intercept B with the abscissa is determined by the preset load upon the first spring 336. It will be seen from this characteristic represented by the straight line A that because the resilience of the first spring 336 is chosen to be small, the stroke increases rapidly in response to a small increase in the force of depression of the brake pedal 321 during the initial phase of the braking operation.

A point C shown in FIG. 7 represents a beginning point when the resilience of both the first spring 336 and the second spring 342 acts upon the brake pedal 321 simultaneously. A characteristic represented by a straight line D is produced by a combination of the first spring 336 and the second spring 342, and has a slope which is determined by a combined effect of a spring constant $k_1$ of the first spring 336 and a spring constant $k_2$ of the second spring constant 342. The combined spring constant k is represented as: $k=k_1+k_2$. Because the resilience of the second spring 342 is chosen to be greater than that of the first spring 336, subsequent to the point C, an increase in the stroke can be reduced in response to a relatively large increase in the force of depression.

It is to be understood that a more excellent brake feeling can be obtained by a combination of the straight lines A and D mentioned above rather than determining the relationship between the stroke and the force of the depression in accordance with a single straight line or a single spring.

It is to be understood that the pseudo-reaction imparting means 331 imparts a pseudo-reaction to the brake pedal 321, which remains substantially unchanged between the quick and the normal braking operation, avoiding the occurrence of an abnormally high reaction during a quick braking operation as experienced with a conventional arrangement. Accordingly, a high braking output can be obtained with a relatively small force of depression during a quick braking operation, and thus a reliable quick operation is assured for a powerless driver such as an aged person or woman.

Fifth Embodiment

Figure 8:
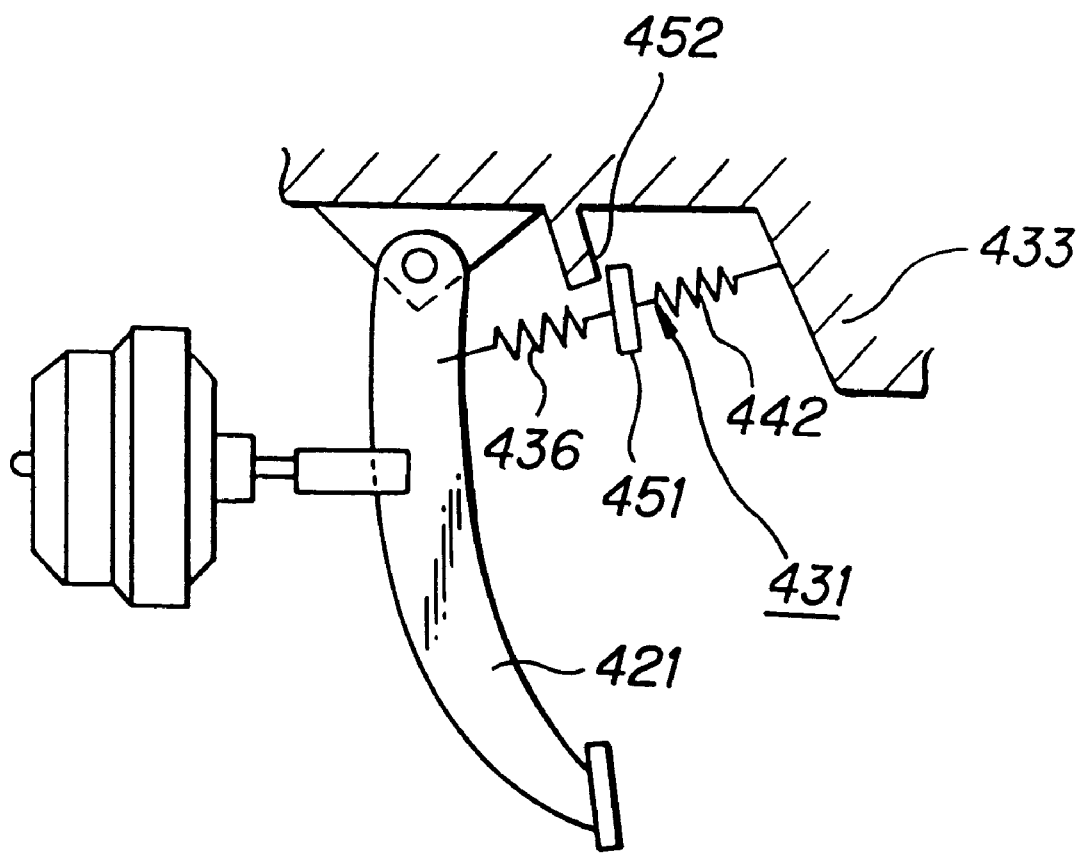
FIG. 8 is a schematic view of a fifth embodiment of the invention.

FIG. 8 shows a fifth embodiment of the invention in which a pair of springs are disposed in series rather than in a parallel relationship as shown in the fourth embodiment. As before, parts and members corresponding to those shown in FIG. 1 are designated by like numerals as used in FIG. 1 to which 400 is added.

In the present embodiment, a pseudo-reaction imparting means 431 comprises a pair of a first spring 436 and a second spring 442 which are disposed in series between a brake pedal 421 and a carrosserie 433 and which are connected to each other. A stop plate 451 is provided at the juncture between the both springs 436, 442, and the stop plate is disposed for abutment against a stop 452 mounted on the carrosserie 433.

In the inoperative condition, the stop plate 451 is spaced a given distance from the stop 452, and when the brake pedal 421 is depressed under this condition, the both springs 436, 442 are tensioned to cause the stop plate 451 to abut against the stop 452, whereupon only the first spring 436, which is located nearer to the brake pedal 421 will be tensioned. A combined spring constant k when a pair of springs which are connected in series are tensioned is given as $k=k_1 \cdot k_2/(k_1+k_2)$ where $k_1$ and $k_2$ represent the spring constant of the respective springs. It will be apparent from this equation that the combined spring constant k will be reduced than any one of the spring constants $k_1$ and $k_2$ of the respective springs, and such a combined spring constant k having a reduced magnitude can be used to achieve the characteristic as represented by the straight line A shown in FIG. 7.

On the other hand, subsequent to the abutment of the stop plate 451 against the stop 452, only the first spring 436 will be tensioned, thus producing the characteristic as represented by the straight line D shown in FIG. 7 in accordance with the spring constant $k_1$.

In each of the described embodiments, each single spring 336, 342, 436, 442 may comprise a plurality of springs which are connected together in series or in parallel, thereby providing a required combined spring constant in a flexible manner.

Sixth Embodiment

Figure 9:
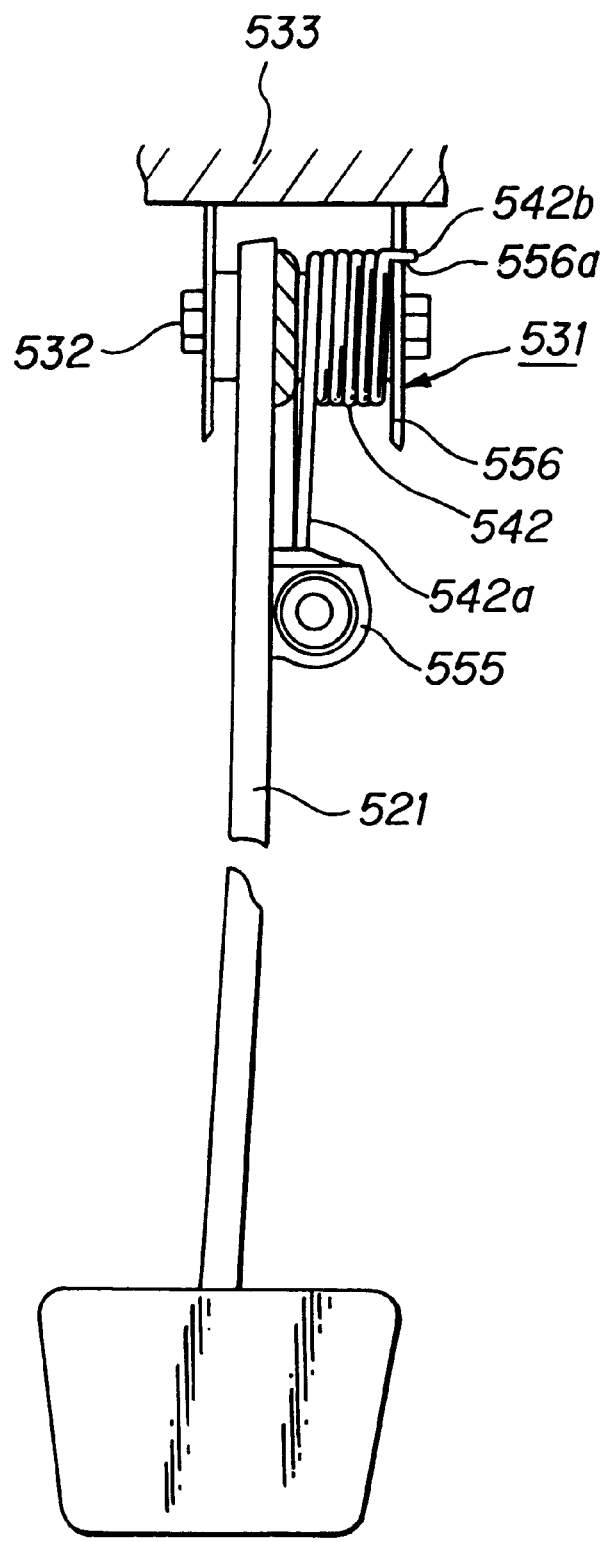
FIG. 9 is a front view of a sixth embodiment of the invention.
Figure 10:
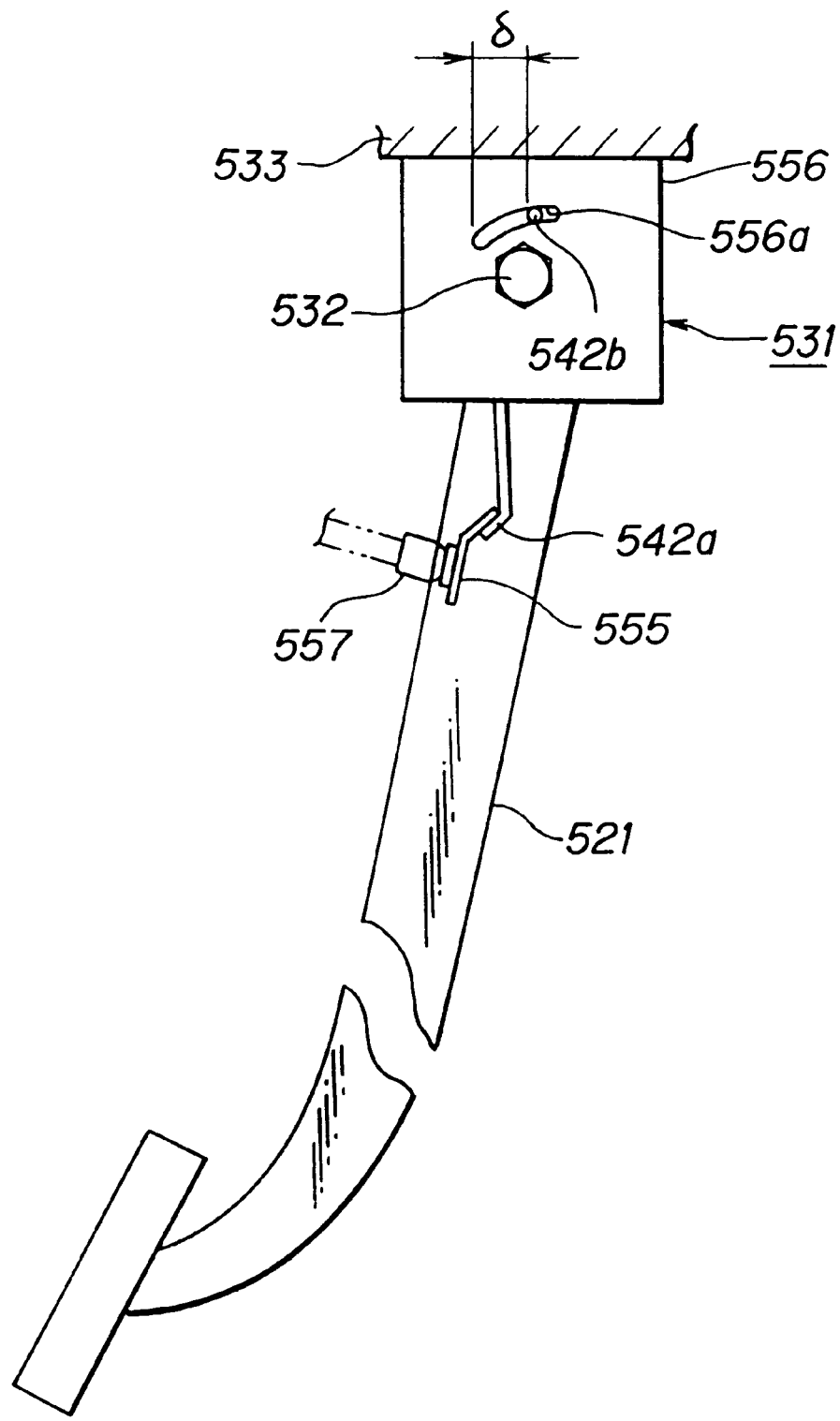
FIG. 10 is a side elevation of FIG. 9.

FIGS. 9 and 10 show a sixth embodiment of the invention in which a pseudo-reaction imparting means 531 comprises a first spring which utilizes the valve return spring 20 shown in FIG. 1 and a second spring which comprises a torque spring 542. As before, parts and members corresponding to those shown in FIG. 1 are designated by like reference numerals as used in FIG. 1 to which 500 is added.

The torque spring 542 is disposed in surrounding relationship with a connecting pin 532 which connects a brake pedal 521 to a carrosserie 533. One end 542a of the torque spring abuts against a stop 555 mounted on the brake pedal 521 while the other end 542b is engaged with an arcuate groove 556a formed in a bracket 556 which forms part of the carrosserie 533. The arcuate groove 556a is formed to be arcuate about the connecting pin 532.

The brake pedal 521 is normally maintained such that the stop 555 is in abutment against a stop 557 which is mounted on the carrosserie 533. Under this condition, the other end 542b of the torque spring 542 is spaced a given distance δ from the end of the arcuate groove 556a.

When the brake pedal 521 is depressed under this condition, an input shaft is driven forward against the resilience of the valve return spring 20, and subsequently when the other end 542b of the torque spring 542 abuts against the end of the arcuate groove 556a, the resilience of the torque spring 542 becomes acting upon the brake pedal 521.

Accordingly, a characteristic as represented by the straight line A shown in FIG. 7 is achieved by the valve return spring 20 while a characteristic as represented by the straight line D as shown in FIG. 7 can be achieved by a combination of the valve return spring 20 and the torque spring 542.

In the described embodiments, the brake pedal 241, 321, 421 or 521 is utilized as an operating rod, but the operating rod may also comprise a manual brake lever which is provided for a physically handicapped person. It should be understood that the invention is also applicable to a clutch booster where a clutch pedal is used as an operating rod.

While the invention has been disclosed above in connection with several embodiments thereof, it should be understood that these embodiments are illustrative only, and that a number of changes, modification and substitutions therein are possible without departing from the spirit and the scope of the invention as defined by the appended claims.

What is claimed is:

1. In a booster including a valve body slidably disposed within a shell, a power piston mounted on the valve body, a constant pressure chamber and a variable pressure chamber defined adjacent opposite sides of the power piston, a valve mechanism disposed in the valve body, an input shaft connected to an operating rod for driving a valve plunger, which forms the valve mechanism, back and forth to switch a flow path in the valve mechanism, and an output shaft driven forward as the valve body is driven forward;

a reaction mechanism for the booster comprising a pseudo-reaction imparting means which prevents a reaction applied to the output shaft from being transmitted to the valve plunger when the booster is operative and which imparts a pseudo-reaction which depends on a travel of the input shaft, the input shaft being coupled to a pedal through a clevis and a clevis pin, an elastic member which defines the pseudo-reaction imparting means being disposed between at least one of the clevis and clevis pin and part of the car, wherein said elastic member is a plurality of springs.

2. A reaction mechanism for booster according to claim 1, comprising that said plurality of springs are connected in parallel relationship with each other.

3. A reaction mechanism for booster according to claim 1, comprising that said plurality of springs are connected in series relationship with each other.

4. In a booster including a valve body slidably disposed within a shell, a power piston mounted in the valve body, a constant pressure chamber and a variable pressure chamber defined adjacent opposite sides of the power piston, a valve mechanism disposed in the valve body, an input shaft connected to an operating rod for driving a valve plunger, which forms the valve mechanism, back and forth to switch a flow path in the valve mechanism, and an output shaft driven forward as the valve body is driven forward;

a reaction mechanism for the booster comprising a pseudo-reaction imparting means which prevents a reaction applied to the output shaft from being transmitted to the valve plunger when the booster is operative and which imparts a pseudo-reaction which depends on a travel of the input shaft, the pseudo-reaction imparting means imparting a pseudo-reaction having a reduced rate of increase to the input shaft when a travel of the input shaft is small, and imparts a pseudo-reaction having an increased rate of increase to the input shaft when a travel of the operating rod is farther, the input shaft being coupled to a pedal through a first clevis and a clevis pin, a first spring which forms the pseudo-reaction imparting means being disposed between at least one of the first clevis and clevis pin and a part of a car body, further including a second clevis which is reciprocable relative to the input shaft within a given extent, a second spring being disposed between the second clevis and a part of the car body to maintain the second clevis in abutment against a stop normally, a forward movement of the input shaft through a given stroke as it is operated being effective to cause the input shaft and the second clevis to be driven forward in an integral manner.

5. A reaction mechanism for booster according to claim 4 in which the second spring has a greater resilience than the first spring.

6. In a booster including a valve body slidably disposed within a shell, a power piston mounted in the valve body, a constant pressure chamber and a variable pressure chamber defined adjacent opposite sides of the power piston, a valve mechanism disposed in the valve body, an input shaft connected to an operating rod for driving a valve plunger, which forms the valve mechanism, back and forth to switch a flow path in the valve mechanism, and an output shaft driven forward as the valve body is driven forward;

a reaction mechanism for the booster comprising a pseudo-reaction imparting means which prevents a reaction applied to the output shaft from being transmitted to the valve plunger when the booster is operative and which imparts a pseudo-reaction which depends on a travel of the input shaft, the pseudo-reaction imparting means imparting a pseudo-reaction having a reduced rate of increase to the input shaft when a travel of the input shaft is small, and imparts a pseudo-reaction having an increased rate of increase to the input shaft when a travel of the operating rod is farther, the input shaft being coupled to a first clevis and a clevis pin, a first spring and a second spring which are connected in series with each other and which form the pseudo-reaction imparting means being disposed between at least one of the first clevis and clevis pin and a part of a car body, a stop plate being disposed at the juncture between the both springs and capable of abutting against a stop mounted on a part of the car body.

* * * * *